Aug. 14, 1934.  L. C. SMITH  1,970,105
CONDENSER AND METHOD OF MAKING THE SAME
Filed March 24, 1932
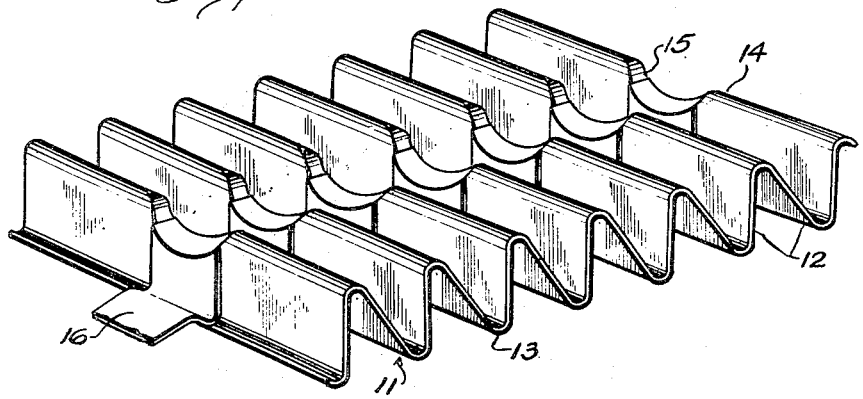
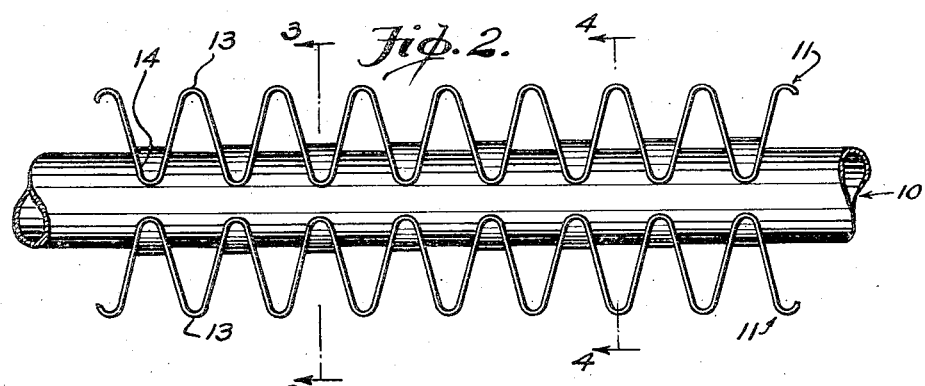
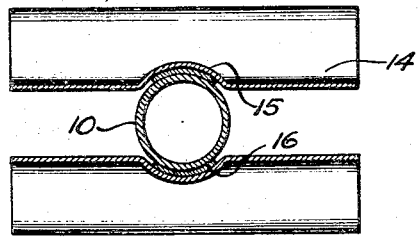
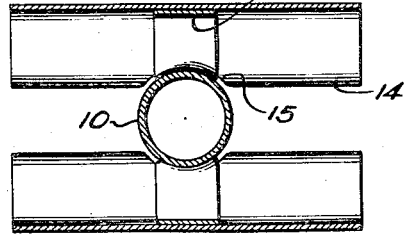
INVENTOR
Lawrence C. Smith
BY
Albert R. Henry
ATTORNEY Patented Aug. 14, 1934

1,970,105

UNITED STATES PATENT OFFICE 1,970,105

CONDENSER AND METHOD OF MAKING THE SAME

Lawrence C. Smith, Buffalo, N. Y., assignor to Fedders Manufacturing Company, Inc., Buffalo, N. Y.

Application March 24, 1932, Serial No. 600,901

4 Claims. (Cl. 113—118)

My invention relates to a condenser and method of making the same, and it has particular reference to a condenser including a tube or pipe with which is integrated a series of cooling fins, so that liquid flowing through the pipe may absorb or deliver heat from or to the medium surrounding the fins.

In the art of mechanical refrigeration, a fluid, such as ammonia or sulphur dioxide is compressed and thereby becomes warm, the compressed gas is then allowed to dissipate its heat into the atmosphere or a body of liquid, and the now cold compressed gas or liquid is allowed to expand in a different region, whereby a cooling effect is obtained, due to the reabsorption of heat. The apparatus for divesting the compressed gas of its excess heat is commonly known as a condenser, and the present invention will be set forth with particular relation to its application in a structure suitable for such purpose, and its method of manufacture.

It has heretofore been proposed, in the manufacture of devices of this character, to place corrugated or undulated sheets of thin metal on opposite sides of a length of tubing, and to assemble the tubing and sheet metal by means of solder. The actual labor involved in soldering an adequate number of contacting portions of fin and tubing is great, and it has been found that with the type of labor available for production purposes, inadequate contact or union frequently results, with a corresponding diminution in the efficiency of the finished apparatus. It has also been observed that ordinary soldering methods cause the metal, usually copper, of which the tubing and fins is formed, to become overheated. The high temperature draws the temper of the metal, and also causes oxidation, with the result that even if the operator is careful and is highly skilled, the finished article is defective, as subsequent curative heat treatment or working of the metal obviously cannot be resorted to. Viewed from these several angles, it may be simply stated that present day production methods do not yield the desired product except at the expense of excessive labor or metal costs, all of which, of course, evidences inefficiencies in manufacture.

According to the present invention, these and other difficulties are obviated, by forming the cooling fins in a suitably corrugated or undulated fashion, whereby they may be associated with the tubing, but interposing between the two, prior to such assembly, a strip of ribbon composed of solder, and, further, in forming the fin as a laminated structure of copper and solder. Upon assembly, therefore, there is provided a layer of solder ribbon, between the tube and the fin, following the lines of mutual contact. When heat is applied to the associated parts, the solder quickly melts and forms a seal between the members, which is so strong as practically to integrate the tubing and fins at all points of contact.

A typical embodiment of the invention is illustrated in the accompanying drawing, wherein:

Fig. 1 is a perspective of a portion of a corrugated and laminated fin member;

Fig. 2 is a side elevation of the fins assembled with a condenser tube;

Fig. 3 is a section taken on the line 3—3 of Fig. 2; and,

Fig. 4 is a section taken on the line 4—4 of Fig. 2.

Referring to Fig. 2, a length of condenser tubing 10, formed of copper or like metal, is assembled with corrugated or pleated strips of sheet metal ribbon 11, serving, in use, as heat radiating fins. It will be observed that the ribbons 11 are provided with transversely formed laterally projecting portions 12, merging into crests 13, and troughs 14 which are adapted to contact with limited surface portions of the tubing 10. As shown in the remaining figures, the troughs 14 are flattened along their mid portions to form curved zones of contact 15, so that, upon assembly, a substantial percentage of fin surface is in thermal contact with the wall of the tubing 10.

Disposed along the midportion of the fin 11 is a strip of ribbon 16 composed of solder, or other metal adapted, upon the application of heat, to melt and to integrate the fins and the tubing. As best shown in Fig. 1, the strip 16 contacts with the ribbon throughout its entire length. In the manufacture of this laminated structure, the ribbon may be run from a spool into the machinery or dies employed for forming the fin from flat stock. It has been found that, by pressing the solder ribbon onto the fin stock, during the formative operations, a bonding effect is obtained, whereby the ribbon will adhere to the fin during subsequent handling in the course of manufacture of the completed article. This pressing operation, while not necessarily adequate to develop local heat fusing the solder ribbon to the fin, nevertheless causes enough adhesion between the two members to make it possible for the two parts to be treated as one, insofar as subsequent assembly operations are concerned.

Having thus made the article shown in Fig. 1, the tubing 10 and the pairs of fins 11 are assembled with each other, as shown in Fig. 2. It will be observed that the flattened portions 15 contact the tubing, through the ribbon 16 of interposed solder, and, with the parts in this position, the assembly is held in place by any suitable means, such as clamping frames.

The next step in the process is to apply heat to the fins, solder, and tubing, so that the solder is melted to form a bond between the parts. In practice, the heat may be applied in a number of ways. Due to the proximity of the solder to the fins and tubing, its thinness, and the reserve amount of solder included between the sloping portions 12 of the fin 11, a quick application of flame heat, as, for example, that from a gas burner, will serve to melt the solder and to effect the desired bonding. Thereafter, the assembly is cooled quickly, by immersion in a water bath. In another way of heating, electricity may be passed along the tube 10 or the fins 11, to develop heat sufficient to melt the solder.

It will be found, upon examination of the final article, that the solder has effectively united the fins and the tubing, at all points of mutual contact. In fact, it has been observed that the strength of the bond is greater than the strength of the metal, so that it is impossible to separate the fins from the tubing by mechanical force, without tearing one or the other. This effect, obtained in a uniform manner, cannot be obtained with other methods of assembly known to me, with the same economies of manufacture. It may also be noted that the integrating effect just described is obtained so quickly that deterioration of the quality of the metal of the fins and tubing is not experienced, which therefore permits of the use of lighter weights of tubing and fin strips, with resulting economies in manufacture and increase of thermal efficiency.

It will be understood that the specific formation of the ribbon 11 and the pipe 10 may be varied to meet the requirements of design, and that the embodiment of the invention illustrated and described is intended to be typical of the features set forth in the following claims.

I claim:

1. A heat dissipating member comprising a copper ribbon formed with continuous undulating portions determined by crests and troughs, flattened portions formed in the troughs along the longitudinal axis of the ribbon, and a ribbon of solder superimposed on the copper ribbon and along the longitudinal axis thereof, said solder ribbon being coextensive with the length of the copper ribbon and being lightly bonded thereto.

2. A heat dissipating member comprising a copper ribbon formed with continuous undulating portions extending transversely thereof and defined by crests and troughs, flattened contact areas formed in the troughs along the longitudinal axis of the ribbon, and a solder ribbon disposed along the longitudinal axis of the copper ribbon and following in adhering contact the contour thereof.

3. The method of integrating undulated metal ribbon with a straight length of tubing which comprises forming a strip of metal into an undulated ribbon, forming flat contact areas on the ribbon, superimposing on the ribbon a length of fusing metal following the contour of the ribbon and contacting with the flat portions thereof to form a laminated unit, laying up the unit thus formed with a tube disposed in contact with said flat portions, holding the unit and tube in their assembled relationship, applying to the structure heat in a quantity sufficient to melt the fusing ribbon, and cooling the heated portions.

4. In the manufacture of condenser units, the method comprising superimposing a copper fin sheet and a solder ribbon, simultaneously deforming the two by pressure into undulated form, applying lengths of the laminated structure to opposite sides of a copper tube, holding the parts together with the deformed solder ribbon contacting the tube, melting the solder ribbon and quenching the assembly.

LAWRENCE C. SMITH.